(12) United States Patent
Mizobe

(10) Patent No.: US 11,747,001 B2
(45) Date of Patent: *Sep. 5, 2023

(54) ATTACHMENT DEVICE FOR AIRCRAFT LANDING GUIDANCE FLASHING LIGHT AND AIRCRAFT LANDING GUIDANCE FLASHING DEVICE

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,184

(22) Filed: Oct. 7, 2022

(65) Prior Publication Data

US 2023/0044041 A1 Feb. 9, 2023

Related U.S. Application Data

(63) Continuation of application No. 17/391,274, filed on Aug. 2, 2021, now Pat. No. 11,493,193, which is a
(Continued)

(30) Foreign Application Priority Data

Feb. 2, 2017 (JP) ................................ 2017-017316

(51) Int. Cl.
*F21V 21/26* (2006.01)
*B64F 1/20* (2006.01)
(Continued)

(52) U.S. Cl.
CPC ................ *F21V 21/26* (2013.01); *B64F 1/18* (2013.01); *B64F 1/20* (2013.01); *F21V 21/116* (2013.01);
(Continued)

(58) Field of Classification Search
CPC ........ F21V 21/26; F21V 21/116; F21V 21/30; B64F 1/18; B64F 1/20
See application file for complete search history.

(56) References Cited

U.S. PATENT DOCUMENTS 3,784,968 A * 1/1974 Brosow ..................... B64F 1/20
340/955
4,450,507 A * 5/1984 Gordin ..................... B60Q 1/24
362/543
(Continued)

FOREIGN PATENT DOCUMENTS

CN 205592748 U 9/2016
JP 56-137132 U 10/1981
(Continued)

OTHER PUBLICATIONS

Communication dated Jul. 10, 2020 from Australian Patent Office in AU Application No. 2017396680.
(Continued)

*Primary Examiner* — Arman B Fallahkhair
(74) *Attorney, Agent, or Firm* — Sughrue Mion, PLLC

(57) ABSTRACT

The present invention provides an attachment device for an aircraft landing guidance flashing light and an aircraft landing guidance flashing device that do not require adjustment of the angle of the flashing light at the time of attaching an aircraft landing guidance flashing light to the attachment device for an aircraft landing guidance flashing light. An attachment device for an aircraft landing guidance flashing light includes a pair of attachment arms 11; and a light emitting portion fixing plate 12. The light emitting portion fixing plate 12 detachably fixes an aircraft landing guidance flashing light. The light emitting portion fixing plate 12 is supported by the pair of attachment arms 11 such that an angle of the aircraft landing guidance flashing light is at a
(Continued)

predetermined angle in a state where the aircraft landing guidance flashing light is fixed to the light emitting portion fixing plate.

9 Claims, 4 Drawing Sheets

Related U.S. Application Data continuation of application No. 16/482,078, filed as application No. PCT/JP2017/041537 on Nov. 17, 2017, now Pat. No. 11,112,100.

(51) Int. Cl.
| | | |
|---|---|---|
| *F21V 21/116* | (2006.01) | |
| *B64F 1/18* | (2006.01) | |
| *F21V 21/30* | (2006.01) | |
| *F21W 111/06* | (2006.01) | |

(52) U.S. Cl.
CPC .......... *F21V 21/30* (2013.01); *F21W 2111/06* (2013.01)

(56) References Cited

U.S. PATENT DOCUMENTS

| | | | | |
|---|---|---|---|---|
| 4,856,896 | A * | 8/1989 | Farr | G08G 5/0026 |
| | | | | 340/955 |
| 5,800,048 | A | 9/1998 | Gordin | |
| 5,887,966 | A | 3/1999 | Eissner | |
| 7,686,483 | B1 * | 3/2010 | Aubrey | F21V 29/83 |
| | | | | 362/147 |
| 8,342,714 | B1 * | 1/2013 | Rea | H01J 61/025 |
| | | | | 362/264 |
| 9,091,424 | B1 * | 7/2015 | Mart | F21V 29/677 |
| 9,581,303 | B2 | 2/2017 | Gordin et al. | |
| 9,752,749 | B2 * | 9/2017 | Adams | B60Q 1/0483 |
| 10,330,284 | B2 * | 6/2019 | Gordin | F21V 11/183 |
| 10,401,007 | B1 * | 9/2019 | York | H05B 47/19 |
| 11,112,100 | B2 * | 9/2021 | Mizobe | F21V 21/30 |
| 11,493,193 | B2 * | 11/2022 | Mizobe | B64F 1/20 |
| 2009/0080193 | A1 * | 3/2009 | Peck | F21V 21/30 |
| | | | | 362/249.02 |
| 2013/0094192 | A1 * | 4/2013 | De Boeck | B64F 1/20 |
| | | | | 362/145 |
| 2014/0204218 | A1 * | 7/2014 | Gebhard | B60R 11/00 |
| | | | | 362/372 |
| 2016/0223173 | A1 * | 8/2016 | Chauvet | F21V 23/003 |
| 2016/0281965 | A1 | 9/2016 | Schneider et al. | |
| 2017/0167695 | A1 | 6/2017 | Erdener | |
| 2017/0184261 | A1 | 6/2017 | Casper et al. | |
| 2017/0299161 | A1 * | 10/2017 | Boorom | F21V 5/007 |
| 2018/0119940 | A1 * | 5/2018 | Zhou | F21V 31/03 |
| 2018/0328571 | A1 * | 11/2018 | Hunter | B64F 1/20 |
| 2022/0243904 | A1 * | 8/2022 | Bhalerao | F21V 21/30 |

FOREIGN PATENT DOCUMENTS

| | | |
|---|---|---|
| JP | 60-115405 U | 8/1985 |
| JP | 4-117018 U | 10/1992 |
| JP | 2007-137187 A | 6/2007 |
| JP | 2012-227007 A | 11/2012 |
| JP | 2013525985 A | 6/2013 |
| KR | 10-1269080 B1 | 5/2013 |
| KR | 10-1288456 B1 | 7/2013 |
| KR | 10-1449534 B1 | 10/2014 |
| WO | 2007/067932 A2 | 6/2007 |

OTHER PUBLICATIONS

International Search Report for PCT/JP2017/041537 dated Feb. 13, 2018 [PCT/ISA/210].
Office Action issued in the corresponding Japanese patent application (No. 2018-565955) dated Apr. 6, 2021.
Office Action dated Oct. 4, 2022 issued by the Japanese Patent Office in Japanese Application No. 2021-200511.

* cited by examiner

FIG. 3(A)
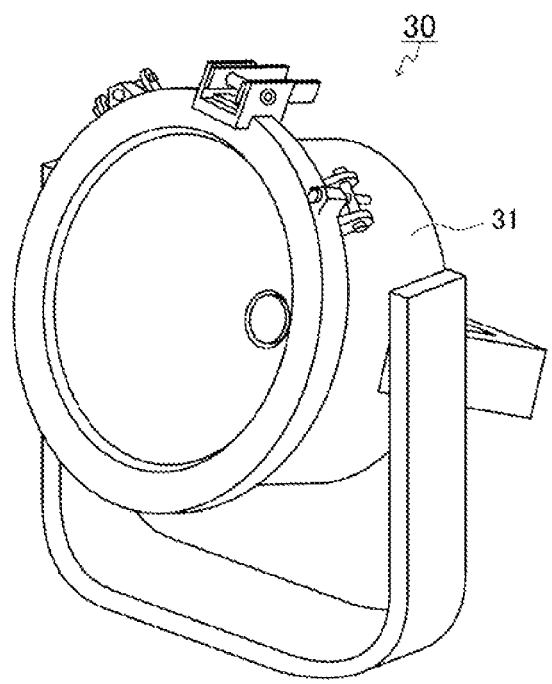
FIG. 3(B)
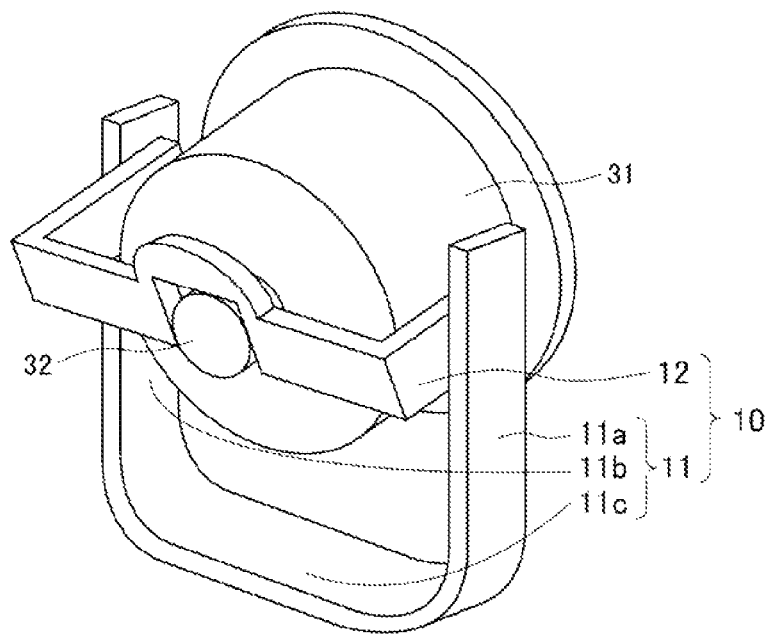
FIG.3

ATTACHMENT DEVICE FOR AIRCRAFT LANDING GUIDANCE FLASHING LIGHT AND AIRCRAFT LANDING GUIDANCE FLASHING DEVICE

CROSS REFERENCE TO RELATED APPLICATIONS

This application is a Continuation of U.S. application Ser. No. 17/391,274, filed on Aug. 2, 2021, which is a Continuation of U.S. application Ser. No. 16/482,078, filed on Jul. 30, 2019, now U.S. Pat. No. 11,112,100 issued on Sep. 7, 2021, which is a National Stage of International Application No. PCT/JP2017/041537, filed on Nov. 17, 2017, which claims priority from Japanese Patent Application No. 2017-017316, filed on Feb. 2, 2017, the contents of all of which are incorporated herein by reference in their entireties.

TECHNICAL FIELD

The present invention relates to an attachment device for an aircraft landing guidance flashing light and an aircraft landing guidance flashing device.

BACKGROUND ART

Aircraft landing guidance flashing devices often have their light emitting portions (aircraft landing guidance flashing lights, hereinafter also referred to as "flashing lights") removed from attachment arms of attachment devices for aircraft landing guidance flashing lights for maintenance and checking such as troubleshooting.

In addition, in a current aircraft landing guidance flashing device, the angle of the flashing light is adjusted by adjusting the angle of attaching the flashing light to the attachment arm every time the attachment of the flashing light (Patent Literature 1). It should be noted that even when the flashing portion is detached from the installation surface of the leg (base portion) or the like together with the attachment arm, the angle of the flashing light needs to be adjusted every time the attachment of the flashing portion.

CITATION LIST

Patent Literature

Patent Literature 1: Japanese Unexamined Utility Model Application Publication No. H04(1992)-117018

SUMMARY OF INVENTION

Technical Problem

With the foregoing in mind, it is an object of the present invention to provide an attachment device for an aircraft landing guidance flashing light and an aircraft landing guidance flashing device that do not require adjustment of the angle of the flashing light at the time of attaching the flashing light to the attachment device for an aircraft landing guidance flashing light.

Solution to Problem

In order to achieve the above object, according to one aspect of the present invention there is provided an attachment device for an aircraft landing guidance flashing light (also referred to as "an attachment device" hereinafter), which includes: a pair of attachment arms; and a light emitting portion fixing plate, wherein the light emitting portion fixing plate detachably fixes an aircraft landing guidance flashing light, and the light emitting portion fixing plate is supported by the pair of attachment arms such that an angle of the aircraft landing guidance flashing light is at a predetermined angle in a state where the aircraft landing guidance flashing light is fixed to the light emitting portion fixing plate.

According to another aspect of the present invention there is provided an aircraft landing guidance flashing device (also referred to as "a flashing device", hereinafter), which includes: an aircraft landing guidance flashing light; and an attachment device for an aircraft landing guidance flashing light. In the aircraft landing guidance flashing device, the aircraft landing guidance flashing light is fixed to a light emitting portion fixing plate of the attachment device, and the attachment device is the attachment device for an aircraft landing guidance flashing light according to the present invention.

Advantageous Effects of Invention

According to the present invention, adjustment of the angle of the flashing light is not required at the time of attaching the flashing light to the attachment device for an aircraft landing guidance flashing light.

BRIEF DESCRIPTION OF DRAWINGS

FIGS. 3A and 3B are perspective views showing an example of the configuration of the flashing device according to the third example embodiment.

DESCRIPTION OF EMBODIMENTS

Figure 1:
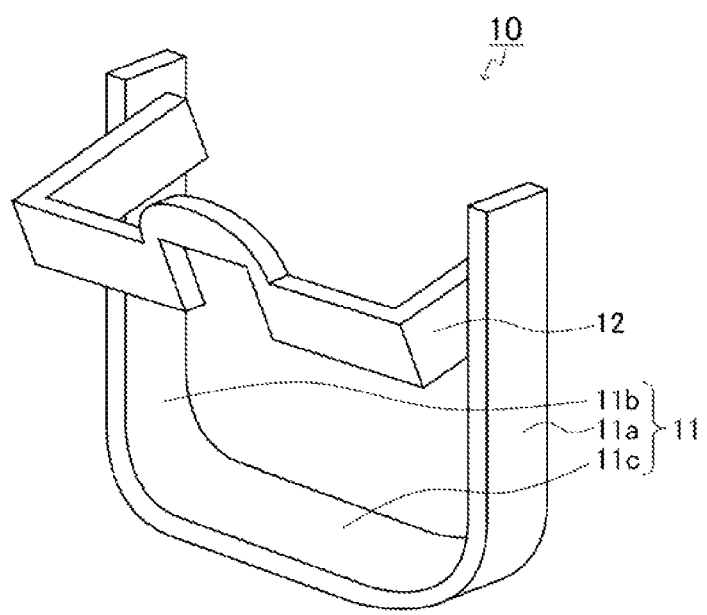
FIG. 1 is a perspective view showing an example of the configuration of the attachment device according to the first example embodiment.

The attachment device of the present invention further includes: an angle adjusting unit, wherein the angle adjusting unit adjusts the angle of the aircraft landing guidance flashing light by adjusting an angle of the light emitting portion fixing plate with respect to the pair of attachment arms, for example.

In the attachment device of the present invention, for example, the angle adjusting unit includes: a rotation shaft; and a bearing of the rotation shaft, at least one of the rotation shaft and the bearing is disposed on the pair of attachment arms, and the other is disposed on the light emitting portion fixing plate.

The attachment device of the present invention includes a rotation shaft fixing unit that fixes the rotation shaft, for example.

In the attachment device of the present invention, for example, the angle adjusting unit further includes: a movable shaft; and a hole for the movable shaft, the hole is an arc-shaped hole centered on the rotation shaft or the bearing of the rotation shaft, the movable shaft is movable within the hole centering on the rotation shaft, at least one of the movable shaft and the hole is disposed on the pair of attachment arms, and the other is disposed on the light emitting portion fixing plate.

The attachment device of the present invention includes a movable shaft fixing unit that fixes the movable shaft, for example.

The attachment device of the present invention further includes a leg, wherein the attachment device is disposed on an installation surface through the leg.

In the attachment device of the present invention, for example, the leg includes: a turning portion, and the turning portion turns the pair of attachment arms.

The attachment device of the present invention further includes an angle checking unit that checks the angle of the light emitting portion fixing plate with respect to the pair of attachment arms, for example.

In the flashing device of the present invention, for example, the aircraft landing guidance flashing light is an LED flashing light.

In the flashing device of the present invention, for example, the aircraft landing guidance flashing light includes: a connection portion that connects a wiring outside the aircraft landing guidance flashing light and a wiring inside the aircraft landing guidance flashing light.

In the flashing device of the present invention, for example, the connection portion is a waterproof connector.

The attachment device and the flashing device of the present invention are described below in detail with reference to the drawings. The present invention, however, is not limited to the following description. In FIGS. 1 to 4, identical parts are indicated with identical reference signs, and the descriptions of the identical parts may be omitted. Furthermore, in the drawings, for convenience in explanation, illustration of the structures of the components may be simplified as appropriate, and the ratio of sizes of components and the like may be schematically shown and different from actual ones.

First Example Embodiment

The present example embodiment relates to an example of an attachment device for use in an aircraft landing guidance flashing device. FIG. 1 is a perspective view showing an example of the configuration of the attachment device according to the present example embodiment. As shown in FIG. 1, an attachment device 10 of the present example embodiment includes a pair of attachment arms 11 and a light emitting portion fixing plate 12. The pair of attachment arms 11 includes a first attachment arm 11a, a second attachment arm 11b, and a bridging plate 11c. The first attachment arm 11a and the second attachment arm 11b are bridged by the bridging plate 11c at the end in the bottom direction (downward direction in FIG. 1) so as to be in a direction substantially perpendicular to the plane direction of the bridging plate 11c. The first attachment arm 11a, the second attachment arm 11b, and the bridging plate 11c are integrally molded as a whole. The light emitting portion fixing plate 12 is a U-shaped plate, and has a convex portion having a substantially arc shape at the center on the bottom side of the U, and a recess (notch) adjacent to the convex portion. The outer surface of one end of the light emitting portion fixing plate 12 is fixed to the inner surface of the upper part (upper side in FIG. 1) of the first attachment arm 11a. The outer surface of the other end of the light emitting portion fixing plate 12 is fixed to the inner surface of the upper part (upper side in FIG. 1) of the second attachment arm 11b. The light emitting portion fixing plate 12 is supported by the first attachment arm 11a and the second attachment arm 11b such that the angle of the flashing light is at a predetermined angle in a state where the flashing light is fixed to the light emitting portion fixing plate 12. The attachment device 10 of the present example embodiment can be installed by directly or indirectly fixing the bottom surface of the bridging plate 11c to the installation surface, for example. The indirect fixation may be, for example, fixation through a leg (base portion) to be described below.

Examples of the material for forming the pair of attachment arms 11 include metals such as aluminum, stainless steel, and the like; and resins.

The pair of attachment arms 11 includes the first attachment arm 11a, the second attachment arm 11b, and the bridging plate 11c which are integrally molded. The pair of attachment arms 11 is only required to support the light emitting portion fixing plate 12, and the shape, size, and the like thereof are not particularly limited. The pair of attachment arms 11 may be composed of, for example, two independent attachment arms. While the pair of attachment arms 11 of the attachment device 10 of the present example embodiment includes the bridging plate 11c, the bridging plate 11c is optional and the attachment device 10 may or may not include the bridging plate 11c. In the case where the pair of attachment arms 11 does not include the bridging plate 11c, the device 10 may be installed, for example, by directly or indirectly fixing the pair of attachment arms 11 to the installation surface. The indirect fixation may be, for example, fixation through a leg (base portion) to be described below.

Examples of the material for forming the light emitting portion fixing plate 12 include metals such as aluminum, stainless steel, and the like; and resins.

While the light emitting portion fixing plate 12 is a U-shaped plate, the shape of the light emitting portion fixing plate 12 may be any shape as long as it can detachably fix the flashing light. The size of the light emitting portion fixing plate 12 is not particularly limited. In the attachment device 10 of the present example embodiment, the light emitting portion fixing plate 12 has a recess at the center on the bottom side of the U. Since the light emitting portion fixing plate 12 has such a recess, for example, even when the flashing light has a protrusion portion such as a connection portion to be described below on the surface to be fixed to the light emitting portion fixing plate 12, the flashing light can be suitably fixed.

The light emitting portion fixing plate 12 can detachably fix the flashing light. The flashing light is to be described below. The method of fixing the light emitting portion fixing plate 12 and the flashing light may be any method as long as the flashing light is detachable, and a known detachable fixing method can be used. As a specific example, the flashing light can be fixed to the light emitting portion fixing plate 12 by screws, for example. The number of the flashing lights fixed to the light emitting portion fixing plate 12 is not particularly limited, and may be, for example, one or two or more, and the former is preferable.

The outer surfaces of both ends of the light emitting portion fixing plate 12 are fixed to the inner surfaces of the first attachment arm 11a and the second attachment arm 11b, respectively. The present invention, however, is not limited thereto and only required that the light emitting portion fixing plate 12 is supported by the pair of attachment arms 11 such that the angle of the flashing light is at a predetermined angle in a state where the flashing light is fixed to the light emitting portion fixing plate 12. In the pair of attachment arms 11, the positions where the light emitting portion fixing plate 12 is attached to are not particularly limited and can be any position. The light emitting portion fixing plate 12 may be supported by the pair of attachment arms 11 through another member such as a supporting tool, for example. The angle of the flashing light may be, for example, the elevation angle, the azimuth angle, or a combination thereof. The predetermined angle is not particularly limited, and can be appropriately determined depending on, for example, the installation location of the attachment device 10, the approach direction of the aircraft, and the like. As a specific example, when the angle of the flashing light is the elevation angle, the predetermined angle is not particularly limited, and is, for example, 3 to 8 degrees.

In the attachment device 10 of the present example embodiment, the light emitting portion fixing plate 12 is supported by the first attachment arm 11a and the second attachment arm 11b, i.e., the pair of attachment arms 11 such that the angle of the flashing light is at a predetermined angle in a state where the flashing light is fixed to the light emitting portion fixing plate 12. Therefore, according to the attachment device 10 of the present example embodiment, by fixing the flashing light to the light emitting portion fixing plate 12 of the attachment device 10, the angle of the flashing light can be set to a predetermined angle. Therefore, according to the attachment device 10 of the present example embodiment, adjustment of the angle of the flashing light is not required at the time of attaching the flashing light to the attachment device 10. Since the attachment device 10 of the present example embodiment can be used for installing flashing lights, it can also be referred to as, for example, "an installation device for an aircraft landing guidance flashing light", "an installation tool for an aircraft landing guidance flashing light", or the like.

The attachment device 10 of the present example embodiment may further include, for example, an angle adjusting unit. The angle adjusting unit can adjust the angle of the aircraft landing guidance flashing light by, for example, adjusting the angle of the light emitting portion fixing plate 12 with respect to the pair of attachment arms 11. The light emitting portion fixing plate 12 is supported by the first attachment arm 11a and the second attachment arm 11b which are the pair of attachment arms 11. Thus, it is preferable that the angle adjusting unit can adjust the angle of the light emitting portion fixing plate 12 with respect to the first attachment arm 11a and the second attachment arm 11b. In this case, the angle adjusting unit includes, for example, a first angle adjusting unit for adjusting the angle of the light emitting portion fixing plate 12 with respect to the first attachment arm 11a and a second angle adjusting unit for adjusting the angle of the light emitting portion fixing plate 12 with respect to the second attachment arm 11b. The first angle adjusting unit is formed at the position where the light emitting portion fixing plate 12 is attached to the first attachment arm 11a, for example. The second angle adjusting unit is formed at the position where the light emitting portion fixing plate 12 is attached to the second attachment arm 11b, for example. If the attachment device 10 includes the first angle adjusting unit and the second angle adjusting unit, for example, the angle adjustment of the light emitting portion fixing plate 12 with respect to the pair of attachment arms 11 is facilitated, thereby facilitating the angle adjustment of the flashing light. Therefore, it is preferable that the angle of the light emitting portion fixing plate 12 with respect to the first attachment arm 11a and the angle of the light emitting portion fixing plate 12 with respect to the second attachment arm 11b be substantially the same.

The angle adjusting unit is not particularly limited, and may be, for example, a unit that adjusts the attachment angle of one member to the other member. The angle adjusting unit may be, for example, a separate member from the pair of attachment arms 11 and the light emitting portion fixing plate 12, or may be a member formed as a part of the pair of attachment arms 11 and the light emitting portion fixing plate 12. As a specific example, the angle adjusting unit may be an angle adjusting unit including a rotation shaft and a bearing of the rotation shaft. In this case, at least one of the rotation shaft and the bearing may be disposed on the pair of attachment arms 11, and the other may be disposed on the light emitting portion fixing plate 12. The rotation shaft is rotatable, for example, in the bearing of the rotation shaft, and more specifically, is rotatably inserted into the bearing of the rotation shaft. The rotation shaft and the bearing of the rotation shaft may be, for example, separate members from the pair of attachment arms 11 and the light emitting portion fixing plate 12, or may be formed as a part of the pair of attachment arms 11 and the light emitting portion fixing plate 12.

According to the attachment device 10 including the angle adjusting unit, the angle of the flashing light can be adjusted so as to be a predetermined angle determined depending on the installation location of the attachment device 10, the approach direction of the aircraft, and the like by adjusting the angle of the light emitting portion fixing plate 12 with respect to the pair of attachment arms 11 at the time of installation of the attachment device 10. Therefore, according to the device 10 including the angle adjusting unit, the same attachment devices 10 can be installed even at places where the installation conditions are different, i.e., at places where the angles of the flashing lights are different.

When the angle adjusting unit includes the rotation shaft, it is preferable that the attachment device 10 of the present example embodiment include a rotation shaft fixing unit that fixes the rotation shaft. The rotation shaft fixing unit is not particularly limited, and may be, for example, a unit that fixes a shaft, a unit that stops rotating, or the like. The rotation shaft fixing unit may be provided on the rotation shaft, that is, the rotation shaft and the rotation shaft fixing unit may be integrally formed. In this case, the rotation shaft is rotatable in an unfixed state, and is not rotatable in a fixed state. The rotation shaft provided with the rotation shaft fixing unit may be, for example, a screw-like member such as a screw, a bolt, or the like. Since the attachment device 10 including the angle adjusting unit includes the rotation shaft fixing unit, for example, the angle of the light emitting portion fixing plate 12 with respect to the pair of attachment arms 11 is prevented from varying after adjustment of the angle of the light emitting portion fixing plate 12 with respect to the pair of attachment arms 11 by the angle adjusting unit such that the angle of the flashing light is at a predetermined angle in a state where the flashing light is fixed to the light emitting portion fixing plate 12. Thus, for example, adjustment of the angle of the flashing light is not required at the time of attaching the flashing light to the attachment device 10.

When the attachment device 10 includes the angle adjusting unit, it is preferable that the position where the light emitting portion fixing plate 12 is attached to the first attachment arm 11a and the position where the light emitting portion fixing plate 12 is attached to the second attachment arm 11b be on, for example, a plane substantially parallel to the installation plane of the attachment device 10. By setting the positions where the light emitting portion fixing plate 12 is attached to the pair of attachment arms 11 in this manner, for example, the elevation angle of the flashing light can be easily adjusted.

When the angle adjusting unit includes the rotation shaft and the bearing of the rotation shaft, the attachment device 10 of the present example embodiment may further include a movable shaft and a hole for the movable shaft. In this case, the hole is an arc-shaped hole centering on the rotation shaft or the bearing of the rotation shaft, and the movable shaft is movable within the hole centering on the rotation shaft. At least one of the movable shaft and the hole is disposed on the pair of attachment arms, and the other is disposed on the light emitting portion fixing plate. The hole may be, for example, an arc-shaped recess or an arc-shaped through hole. In the former case, the movable shaft is inserted into the hole, for example. In the latter case, the movable shaft is inserted through the hole, for example. The center angle of the hole is not particularly limited, and can be appropriately determined depending on the predetermined angle, for example. The movable shaft and the hole for the movable shaft may be, for example, separate members from the pair of attachment arms 11 and the light emitting portion fixing plate 12, or may be formed as a part of the pair of attachment arms 11 and the light emitting portion fixing plate 12.

According to the angle adjusting unit including the movable shaft and the hole for the movable shaft, for example, the angle adjustment of the light emitting portion fixing plate 12 with respect to the pair of attachment arms 11 can be more easily performed such that the angle of the flashing light is at a predetermined angle in a state where the flashing light is fixed to the light emitting portion fixing plate 12.

When the angle adjusting unit includes the movable shaft, it is preferable that the attachment device 10 of the present example embodiment include a movable shaft fixing unit that fixes the movable shaft. The movable shaft fixing unit is not particularly limited, and may be, for example, a unit that fixes a shaft, a unit that stops the movement, or the like. The movable shaft fixing unit may be provided on the movable shaft, that is, the movable shaft and the movable shaft fixing unit may be integrally formed. In this case, the movable shaft is movable in an unfixed state, and is not movable in a fixed state. The movable shaft provided with the movable shaft fixing unit may be, for example, a screw-like member such as a screw, a bolt, or the like. Since the attachment device 10 including the angle adjusting unit includes the movable shaft fixing unit, for example, the angle of the light emitting portion fixing plate 12 with respect to the pair of attachment arms 11 is prevented from varying after adjustment of the angle of the light emitting portion fixing plate 12 with respect to the pair of attachment arms 11 by the angle adjusting unit such that the angle of the flashing light is at a predetermined angle in a state where the flashing light is fixed to the light emitting portion fixing plate 12. Thus, for example, adjustment of the angle of the flashing light is not required at the time of attaching the flashing light to the attachment device 10.

The attachment device 10 of the present example embodiment may further include, for example, a leg, and the attachment device may be disposed on an installation surface through the leg. The leg may include, for example, a turning portion. In this case, the turning portion can turn the pair of attachment arms 11. It is preferable that the turning portion can turn the pair of attachment arms 11 about an axis in a direction substantially perpendicular to the installation surface of the attachment device 10. As described above, by allowing the pair of attachment arms 11 to be turnable about the axis in the direction substantially perpendicular to the installation surface, the angle of the pair of attachment arms 11 can be adjusted more easily such that the angle of the flashing light, more specifically, the azimuth angle of the flashing light is at a predetermined angle in a state where the flashing light is fixed to the light emitting portion fixing plate 12.

The attachment device 10 of the present example embodiment may further include an angle checking unit that checks the angle of the light emitting portion fixing plate 12 with respect to the pair of attachment arms 11. The angle checking unit is not particularly limited, and may check the angle of the light emitting portion fixing plate 12 with respect to either of the attachment arm 11a and the attachment arm 11b or both of the attachment arm 11a and the attachment arm 11b. As the angle checking unit, for example, a known unit that checks the attachment angle of one member to the other member can be used. According to the attachment device 10 including the angle checking unit, for example, since the angle of the light emitting portion fixing plate 12 with respect to the pair of attachment arms 11 can be checked, the angle of the light emitting portion fixing plate 12 with respect to the pair of attachment arms 11 can be prevented from being deviated at the time of attaching the light emitting portion fixing plate 12 to the pair of attachment arms 11. Thus, according to the attachment device 10 including the angle checking unit, for example, the angle of the flashing light can be prevented from being deviated from the predetermined angle at the time of attaching the flashing light to the attachment device 10. When the attachment device 10 of the present example embodiment includes the angle checking unit, the attachment device 10 may further include a level attachment portion to which a level can be detachably attached. The position of the level attachment portion may be, for example, any position as long as the angle of the angle checking unit with respect to the horizontal plane can be checked, and may be, for example, the upper ends of the attachment arms 11a and 11b. In this manner, by providing the level attachment portion, for example, the zero point of the angle checking unit can be adjusted at the time of the installation of the attachment device 10, and thus the angle of the flashing light can be prevented from being deviated from the predetermined angle.

Second Example Embodiment

Figure 2:
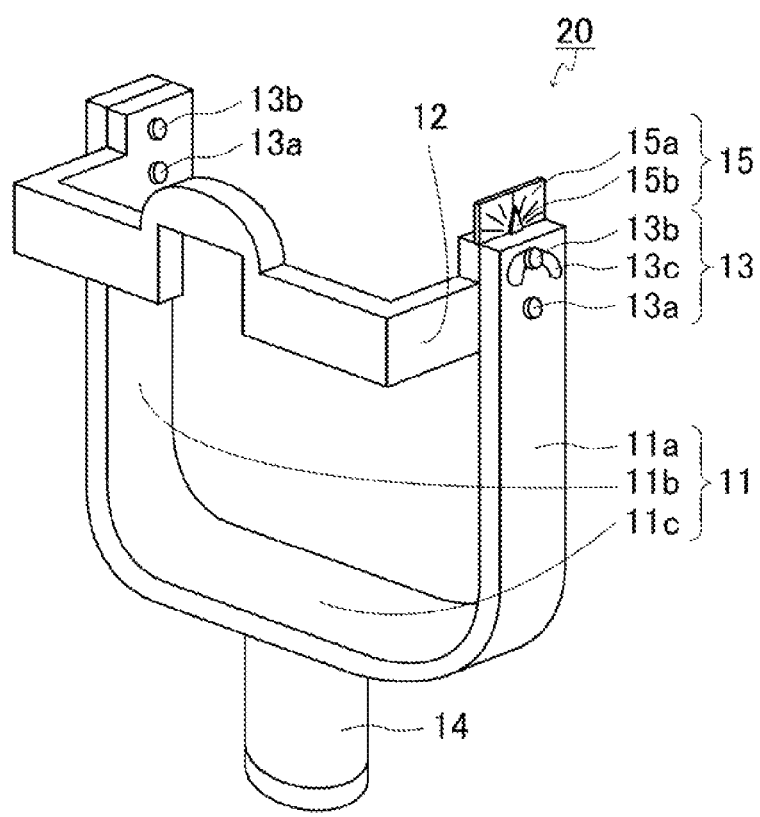
FIG. 2 is a perspective view showing an example of the configuration of the attachment device according to the second example embodiment.

The present example embodiment relates to another example of an attachment device for use in an aircraft landing guidance flashing device. FIG. 2 is a perspective view showing an example of the configuration of the attachment device according to the present example embodiment. As shown in FIG. 2, an attachment device 20 of the present example embodiment includes an angle adjusting unit 13, a leg 14, and an angle checking unit 15 in addition to the components of the attachment device 10 of the first example embodiment. The angle adjusting unit 13 includes a rotation shaft 13a, a bearing (not shown) of the rotation shaft 13a, a movable shaft 13b, and a hole 13c for the movable shaft 13b. In the attachment device 20 of the present example embodiment, the light emitting portion fixing plate 12 is not directly supported by the pair of attachment arms 11, but is indirectly supported through the angle adjusting unit 13. In addition, the light emitting portion fixing plate 12 has convex portions in the upward direction (upper side in FIG. 2) at the positions where the light emitting portion fixing plate 12 is attached to the first attachment arm 11a and the second attachment arm 11b. In the attachment device 20 of the present example embodiment, the bearings are formed on the first attachment arm 11a and the second attachment arm 11b, respectively. The rotation shaft 13a is a screw-shaped member and also serves as the rotation shaft fixing unit. The rotation shaft 13a is inserted through the bearing formed on the first attachment arm 11a or the bearing formed on the second attachment arm 11b, and an end of the rotation shaft 13a on the light emitting portion fixing plate 12 side is connected to the light emitting portion fixing plate 12. The hole 13c is an arc-shaped through hole centering on the rotation shaft 13 formed on the first attachment arm 11a and the second attachment arm 11b in the upward direction (upper side in FIG. 2) of the bearing. The movable shaft 13b is a screw-shaped member and also serves as the movable shaft fixing unit. The movable shaft 13b is inserted through the hole 13c formed on the first attachment arm 11a or the hole 13c formed on the second attachment arm 11b, and an end of the movable shaft 13b on the light emitting portion fixing plate 12 side is connected to the light emitting portion fixing plate 12. In addition, the movable shaft 13b is movable within the hole 13c centering on the rotation shaft 13a. The leg 14 is connected to the bridging plate 11c at the center on the bottom surface side so that the attachment device 20 including the pair of attachment arms 11 can be installed on the installation surface. The angle checking unit 15 includes an angle display portion 15a and a needle 15b. The angle display portion 15a is disposed at the upper end of the light emitting portion fixing plate 12 on the first attachment arm 11a side. The needle 15b is disposed on the upper end of the first attachment arm 11a on the light emitting portion fixing plate 12 side so as to face the center of the angle display portion 15a. Except for this point, the attachment device 20 of the present example embodiment has the same configuration as the attachment device 10 of the first example embodiment, and reference can be made to the description of the first example embodiment.

The angle display portion 15a is not particularly limited, and is only required that a scale of the angle of the light emitting portion fixing plate 12 with respect to the pair of attachment arms 11 is displayed, for example. The angle display portion 15a has a plate shape, and the shape, size, forming material, and the like thereof are not particularly limited. The needle 15b is not particularly limited, and can be any member as long as it indicates the angle of the light emitting portion fixing plate 12 with respect to the pair of attachment arms 11 when it is combined with the angle display portion 15a, for example. The needle 15b has a needle shape, and the shape, size, forming material, and the like thereof are not particularly limited.

In the device 20 of the present example embodiment, when the rotation shaft 13a and the movable shaft 13b are not fixed, for example, the rotation shaft 13a rotates, and the movable shaft 13b moves within the hole 13c centering on the rotation shaft 13a so as to correspond to the rotational direction of the rotation shaft 13a. As described above, one end of each of the rotation shaft 13a and the movable shaft 13b is connected to the light emitting portion fixing plate 12. Thus, the light emitting portion fixing plate 12 rotates about the axis connecting the two rotation shafts 13a in accordance with the rotation of the rotation shaft 13a and the movement of the movable shaft 13b, for example. Thus, when the rotation shaft 13a and the movable shaft 13b are not fixed, for example, the angle of the flashing light can be adjusted by adjusting the angle of the light emitting portion fixing plate 12 with respect to the pair of attachment arms 11. In the device 20 of the present example embodiment, the pair of attachment arms 11 supports the light emitting portion fixing plate 12 at two points, namely, the rotation shaft 13a and the movable shaft 13b at the time of adjusting the angle of the light emitting portion fixing plate 12 with respect to the pair of attachment arms 11. Thus, according to the attachment device 20 of the present example embodiment, for example, the angle of the flashing light can be adjusted more precisely. Furthermore, the rotation shaft 13a and the movable shaft 13b are screw-shaped members as described above. Therefore, by fixing at least one of the rotation shaft 13a and the movable shaft 13b after the adjustment of the angle of the flashing light, for example, the positional relationship between the light emitting portion fixing plate 12 and the pair of attachment arms 11 can be fixed, whereby the angle of the light emitting portion fixing plate 12 with respect to the pair of attachment arms 11 can be fixed. Therefore, for example, by allowing the rotation shaft 13a and the movable shaft 13b to be unfixed before the installation of the flashing light, adjusting the angle of the light emitting portion fixing plate 12 with respect to the pair of attachment arms 11, and allowing the rotation shaft 13a and the movable shaft 13b to be fixed after the adjustment, the adjustment of the angle of the flashing light is not required at the time of attaching the flashing light to the attachment device 20. In the attachment device 20 of the present example embodiment, the angle of the light emitting portion fixing plate 12 with respect to the pair of attachment arms 11 can be adjusted. Therefore, according to the attachment device 20 of the present example embodiment, the same attachment devices 20 can be installed even at places where the installation conditions are different, i.e., at places where the angles of the flashing lights are different.

Third Example Embodiment

The present example embodiment relates to an example of an aircraft landing guidance flashing device. FIGS. 3A and 3B show an example of the configuration of the flashing device of the present example embodiment. FIG. 3A is a front perspective view showing an example of the configuration of the flashing device of the present example embodiment, and FIG. 3B shows a rear perspective view showing an example of the configuration of the flashing device of the present example embodiment. As shown in FIGS. 3A and 3B, a flashing device 30 of the present example embodiment includes the attachment device 10 and a flashing light 31. The attachment device 10 has the same configuration as that of the attachment device 10 of the first example embodiment, and reference can be made to the description of the first example embodiment. The flashing light 31 includes a connection portion 32. The connection portion 32 is disposed on the back surface of the flashing light 31 (a direction opposite to the light emitting direction of the flashing light 31). The back surface of the flashing light 31 is fixed to the light emitting portion fixing plate 12 such that the connection portion 32 is housed in a recess (notch) at the center of the light emitting portion fixing plate 12. While the attachment device 10 of the first example embodiment is used as the attachment device in the flashing device 30 of the present example embodiment, another type of device such as the attachment device 20 of the second example embodiment may be used.

The flashing light 31 is not particularly limited, and, for example, a known aircraft landing guidance flashing light can be used. The type of the light source of the flashing light 31 is not particularly limited. Specific examples of the flashing light 31 include a xenon lamp (flashing light) and an LED (light emitting diode) lamp (LED flashing light).

In the flashing device 30 of the present example embodiment, the flashing light 31 includes the connection portion 32. The connection portion 32, however, is optional and the flashing light 31 may or may not include the connection portion 32. Since the flashing light 31 includes the connection portion 32, the flashing device 30 can be used again by replacing the flashing light 31, for example, when the flashing light 31 fails. Thus, for example, as compared to a flashing light of a type integrated with a wiring, the flashing device 30 is excellent in the maintenance property. The connection portion 32 is only required that it can connect a wiring outside the flashing light 31 and a wiring inside the flashing light 31, for example, and, as a specific example, the connection portion 32 may be a connector of a power supply wiring or the like. The connection portion 32 is preferably a waterproof connection portion, for example, so that a failure after installation can be prevented. While the connection portion 32 is arranged on the back surface of the flashing light 31, the position at the flashing light 31 where the connection portion 32 is disposed is not particularly limited and can be any position.

The flashing device 30 of the present example embodiment includes the attachment device 10. In the attachment device 10, the light emitting portion fixing plate 12 is supported by the first attachment arm 11a and the second attachment arm 11b, i.e., the pair of attachment arms 11 such that the angle of the flashing light is at a predetermined angle in a state where the flashing light is fixed to the light emitting portion fixing plate 12. Therefore, according to the flashing device 30 of the present example embodiment, by fixing the flashing light 31 to the light emitting portion fixing plate 12 of the attachment device 10, the angle of the flashing light 31 can be set to a predetermined angle. Therefore, according to the flashing device 30 of the present example embodiment, adjustment of the angle of the flashing light 31 is not required at the time of attaching the flashing light 31 to the attachment device 10.

Figure 4:
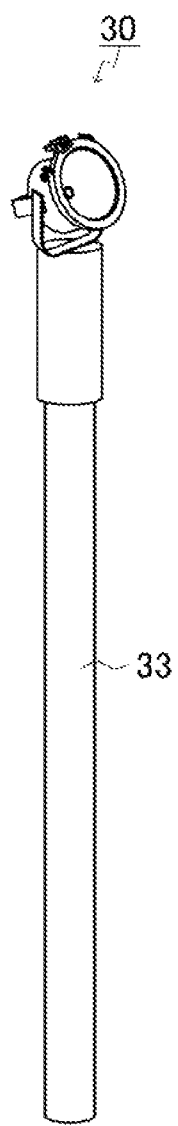
FIG. 4 is a perspective view showing an example of the installation of the flashing device according to the third example embodiment.

Next, an example of the installation of the flashing device 30 of the present example embodiment is described with reference to FIGS. 3A, 3B, and 4. The flashing device 30 of the present example embodiment may be installed on an installation surface such as the ground by the bridging plate 11c of the pair of attachment arms 11. The flashing device 30 of the present example embodiment may further include the leg described above, and may be installed on the installation surface by the leg. The flashing device 30 of the present example embodiment may include, for example, a wiring (e.g., a cable) for supplying power to the flashing light 31. The flashing device 30 shown in FIGS. 3A and 3B may be installed on a pole 33 installed on the ground as shown in FIG. 4.

In the flashing device 30 of the present example embodiment, the flashing light 31 is configured to achieve flashing 120 times per minute, for example. For example, when the flashing device 30 of the present example embodiment is installed in a large airport having a plurality of runways, 8 to 29 flashing devices 30 are arranged at intervals of about 30 m from the approach direction of the aircraft toward the end of the runway. Furthermore, for example, when the flashing device 30 of the present example embodiment is installed in a small airport where the number of arrival and departure of an aircraft is small and is installed with only one short runway, one flashing device 30 is arranged at each side of the runway end in the short direction so as to flash (blink) a total of two lights simultaneously. Furthermore, when the flashing device 30 of the present example embodiment is installed in an airport where an aircraft cannot enter the runway straight, for example, the flashing device 30 is strategically arranged at a predetermined position on the approach to the runway, for example, every several kilometers. The flashing light 31 of the flashing device 30 of the present example embodiment is configured such that the brightness can be switched to three levels in accordance with, for example, the standard specification of the Ministry of Land, Infrastructure, Transport and Tourism. Among these three levels of brightness, "High", which is the brightest level, is used, for example, in the daytime of poor visibility due to fog, rain, or the like, "Low", which is the darkest level, is used, for example, in the night, and "Middle", which is the intermediate level, is used, for example, in the evening.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

Supplementary Notes

A part of or the whole of the above-described example embodiments and examples can be described as the following supplementary notes. However, the present invention is by no means limited thereto.

(Supplementary Note 1)

An attachment device for an aircraft landing guidance flashing light, including:
- a pair of attachment arms; and
- a light emitting portion fixing plate, wherein
- the light emitting portion fixing plate detachably fixes an aircraft landing guidance flashing light, and
- the light emitting portion fixing plate is supported by the pair of attachment arms such that an angle of the aircraft landing guidance flashing light is at a predetermined angle in a state where the aircraft landing guidance flashing light is fixed to the light emitting portion fixing plate.

(Supplementary Note 2)

The attachment device according to supplementary note 1, further including:
- an angle adjusting unit, wherein
- the angle adjusting unit adjusts the angle of the aircraft landing guidance flashing light by adjusting an angle of the light emitting portion fixing plate with respect to the pair of attachment arms.

(Supplementary Note 3)

The attachment device according to supplementary note 2, wherein
- the angle adjusting unit includes:
  - a rotation shaft; and
  - a bearing of the rotation shaft,
- at least one of the rotation shaft and the bearing is disposed on the pair of attachment arms, and
- the other is disposed on the light emitting portion fixing plate.

(Supplementary Note 4)

The attachment device according to supplementary note 3, including:
- a rotation shaft fixing unit that fixes the rotation shaft.

(Supplementary Note 5)

The attachment device according to supplementary note 3 or 4, wherein
- the angle adjusting unit further includes:

a movable shaft; and
a hole for the movable shaft,
the hole is an arc-shaped hole centered on the rotation shaft or the bearing of the rotation shaft,
the movable shaft is movable within the hole centering on the rotation shaft,
at least one of the movable shaft and the hole is disposed on the pair of attachment arms, and
the other is disposed on the light emitting portion fixing plate.

(Supplementary Note 6)
The attachment device according to supplementary note 5, including:
a movable shaft fixing unit that fixes the movable shaft.

(Supplementary Note 7)
The attachment device according to any one of supplementary notes 1 to 6, further including:
a leg, wherein
the attachment device is disposed on an installation surface through the leg.

(Supplementary Note 8)
The attachment device according to supplementary note 7, wherein
the leg includes:
a turning portion, and
the turning portion turns the pair of attachment arms.

(Supplementary Note 9)
The attachment device according to any one of supplementary notes 1 to 8, further including:
an angle checking unit that checks the angle of the light emitting portion fixing plate with respect to the pair of attachment arms.

(Supplementary Note 10)
An aircraft landing guidance flashing device, including:
an aircraft landing guidance flashing light; and
an attachment device for an aircraft landing guidance flashing light, wherein
the aircraft landing guidance flashing light is fixed to a light emitting portion fixing plate of the attachment device, and
the attachment device is the attachment device for an aircraft landing guidance flashing light according to any one of supplementary notes 1 to 9.

(Supplementary Note 11)
The flashing device according to supplementary note 10, wherein the aircraft landing guidance flashing light is an LED flashing light.

(Supplementary Note 12)
The flashing device according to supplementary note 10 or 11, wherein
the aircraft landing guidance flashing light includes:
a connection portion that connects a wiring outside the aircraft landing guidance flashing light and a wiring inside the aircraft landing guidance flashing light.

(Supplementary Note 13)
The flashing device according to supplementary note 12, wherein
the connection portion is a waterproof connector.

According to the present invention, adjustment of the angle of the flashing light is not required at the time of attaching the flashing light to the attachment device for an aircraft landing guidance flashing light. Thus, the attachment device of the present invention can be used, for example, in an attachment device of an aircraft landing guidance flashing device or the like.

REFERENCE SIGNS LIST 10, 20 attachment device
11 pair of attachment arms
11a first arm
11b second arm
11c bridging plate
12 light emitting portion fixing plate
13 angle adjusting unit
13a rotation shaft
13b movable shaft
13c hole for movable shaft
14 leg
15 angle checking unit
15a angle display
15b needle
30 flashing device
31 flashing light
32 connection portion
33 pole

The invention claimed is:
1. An attachment device for an aircraft landing guidance flashing light comprising:
a pair of attachment arms;
a light emitting portion fixing plate; and
an angle adjusting unit,
wherein the pair of attachment arms includes a first attachment arm, a second attachment arm, and a bridging plate,
wherein the first attachment arm and the second attachment arm are bridged by the bridging plate at an end in a bottom direction so as to be in a direction substantially perpendicular to a direction of a planar extent of the bridging plate,
wherein the light emitting portion fixing plate is a U-shaped plate, and has a convex portion having a substantially arc shape at a center on the bottom side of the U, and a recess adjacent to the convex portion, and
wherein an outer surface of a first end of the light emitting portion fixing plate is fixed to an inner surface of an upper part of the first attachment arm,
wherein an outer surface of a second end of the light emitting portion fixing plate is fixed to the inner surface of the upper part of the second attachment arm,
wherein the light emitting portion fixing plate is supported by the first attachment arm and the second attachment arm such that an angle of the aircraft landing guidance flashing light is at a predetermined angle in a state where the aircraft landing guidance flashing light is fixed to the light emitting portion fixing plate,
wherein the angle adjusting unit adjusts the angle of the aircraft landing guidance flashing light by adjusting an angle of the light emitting portion fixing plate with respect to the pair of attachment arms,
wherein the attachment device further comprises a connection portion,
wherein the connection portion is a waterproof connector, and
wherein the connection portion is disposed on a back surface of the aircraft landing guidance flashing light extended in a direction opposite a light emitting direction of the aircraft landing guidance flashing light, and the back surface of the aircraft landing guidance flashing light is fixed to the light emitting portion fixing plate such that the connection portion is detachably housed in the recess at the center of the light emitting portion fixing plate.

2. The attachment device according to claim 1, further comprising:

an angle checking unit has an angle display portion and a needle and displays the angle of the light emitting portion fixing plate with respect to the pair of attachment arms.

3. The attachment device according to claim 2, wherein the angle display portion is disposed at an upper end of the light emitting portion fixing plate on a first attachment arm side of the light emitting portion fixing plate, and wherein the needle is disposed on an upper end of the first attachment arm on a light emitting portion fixing plate side of the first attachment arm so as to face a center of the angle display portion.

4. An aircraft landing guidance flashing device, comprising:

an aircraft landing guidance flashing light; and an attachment device for the aircraft landing guidance flashing light, wherein the aircraft landing guidance flashing light is fixed to a light emitting portion fixing plate of the attachment device, and the attachment device is the attachment device for an aircraft landing guidance flashing light according to claim 1.

5. The aircraft landing guidance flashing device according to claim 4, wherein the aircraft landing guidance flashing light is an LED flashing light.

6. The aircraft landing guidance flashing device according to claim 4, wherein the aircraft landing guidance flashing light comprises:

the connection portion that connects a wiring outside the aircraft landing guidance flashing light and a wiring inside the aircraft landing guidance flashing light.

7. The attachment device according to claim 1, wherein the angle adjusting unit adjusts the angle of the aircraft landing guidance flashing light by adjusting the angle of the light emitting portion fixing plate with respect to the pair of attachment arms.

8. The attachment device according to claim 1, further comprising:

a leg, wherein the attachment device is disposed on an installation surface through the leg; and the leg comprises:

a turning portion, and the pair of attachment arms is capable of turning on the turning portion.

9. The attachment device according to claim 1, wherein the first attachment arm, the second attachment arm, and the bridging plate are integrally molded as a whole.

* * * * *